(12) United States Patent
Sugiura (10) Patent No.: US 10,767,687 B2
(45) Date of Patent: Sep. 8, 2020

(54) BEARING STRUCTURE AND TURBOCHARGER

(71) Applicant: IHI Corporation, Koto-ku (JP)

(72) Inventor: Tomomi Sugiura, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/254,643

(22) Filed: Jan. 23, 2019

(65) Prior Publication Data
US 2019/0153895 A1 May 23, 2019

Related U.S. Application Data

(63) Continuation of application No. PCT/JP2017/035257, filed on Sep. 28, 2017.

(30) Foreign Application Priority Data

Sep. 29, 2016 (JP) ................... 2016-190814

(51) Int. Cl.
*F16C 17/10* (2006.01)
*F01D 25/16* (2006.01)
(Continued)

(52) U.S. Cl.
CPC .......... *F16C 17/107* (2013.01); *F01D 25/166* (2013.01); *F01D 25/168* (2013.01);
(Continued)

(58) Field of Classification Search
CPC ........ F16C 17/04; F16C 17/10; F16C 17/102; F16C 17/107; F16C 17/18; F16C 33/1065; F16C 2360/23; F16C 33/24
See application file for complete search history.

(56) References Cited

U.S. PATENT DOCUMENTS 6,017,184 A 1/2000 Aguilar et al.
8,534,989 B2 * 9/2013 Groves ............... F16C 33/1065
415/111
(Continued)

FOREIGN PATENT DOCUMENTS

CN 1188192 A 7/1998
CN 1273622 A 11/2000
(Continued)

OTHER PUBLICATIONS

International Search Report dated Dec. 12, 2017 in PCT/JP2017/035257 filed on Sep. 28, 2017 (with English Translation).
(Continued)

*Primary Examiner* — James Pilkington
(74) *Attorney, Agent, or Firm* — Oblon, McClelland, Maier & Neustadt, L.L.P.

(57) ABSTRACT

A bearing structure includes a radial bearing surface for rotatably supporting a shaft; and a radial groove including a front wall surface portion and extending to one end of a radial bearing surface, the front wall surface portion being formed between a rear continuous portion and a front continuous portion positioned on the radial bearing surface, and extending from the front continuous portion along an imaginary line or extending forward from the front continuous portion relative to the imaginary line in the rotation direction, the imaginary line intersecting a tangent of the radial bearing surface at the front continuous portion at degrees and extending from the front continuous portion in a direction separated from the shaft and backward in the rotation direction, in a cross-section orthogonal to an axial direction of the shaft.

6 Claims, 10 Drawing Sheets

(51) Int. Cl.
*F16C 33/10* (2006.01)
*F16C 17/02* (2006.01)

(52) U.S. Cl.
CPC .......... *F16C 17/02* (2013.01); *F16C 33/1065* (2013.01); *F05D 2220/40* (2013.01); *F16C 2360/24* (2013.01)

(56) References Cited

U.S. PATENT DOCUMENTS

| | | | |
|---|---|---|---|
| 9,140,185 B2 * | 9/2015 | Castan | ................ F16C 33/1065 |
| 2010/0061668 A1 | 3/2010 | Petitjean et al. | |

FOREIGN PATENT DOCUMENTS

| | | |
|---|---|---|
| CN | 1379184 A | 11/2002 |
| CN | 101672216 A | 3/2010 |
| CN | 103291753 A | 9/2013 |
| CN | 104718387 A | 6/2015 |
| EP | 1 312 770 A2 | 5/2003 |
| EP | 2 163 731 A1 | 3/2010 |
| JP | 5-202936 | 8/1993 |
| JP | 2001-512801 | 8/2001 |
| JP | 2002-070570 | 3/2002 |
| JP | 2005-133635 | 5/2005 |
| JP | 2007-023858 | 2/2007 |
| JP | 2014-051898 | 3/2014 |
| JP | 2014-238009 | 12/2014 |
| JP | 2016-114221 | 6/2016 |
| WO | WO 99/07982 A1 | 2/1999 |

OTHER PUBLICATIONS

Written Opinion dated Dec. 12, 2017 in PCT/JP2017/035257 filed on Sep. 28, 2017.
Chinese Office Action issued in Chinese Patent Application No. 201780045435.X dated Jun. 17, 2020, (w/ English translation).

* cited by examiner

BEARING STRUCTURE AND TURBOCHARGER

CROSS REFERENCE TO RELATED APPLICATIONS

This application is a continuation application of International Application No. PCT/JP2017/035257, filed on Sep. 28, 2017, which claims priority to Japanese Patent Application No. 2016-190814, filed on Sep. 29, 2016, the entire contents of which are incorporated by reference herein.

BACKGROUND ART

Technical Field

The present disclosure relates to a bearing structure having a radial bearing surface and a turbocharger having the bearing structure.

Related Art

In related art, a turbocharger in which a shaft is rotatably supported in a bearing housing is known. The shaft has one end provided with a turbine impeller. The shaft has the other end provided with a compressor impeller. The turbocharger is connected to an engine. The turbine impeller rotates by exhaust gas discharged from the engine. The rotation of the turbine impeller causes the compressor impeller to rotate via the shaft. The turbocharger compresses air with the rotation of the compressor impeller and delivers the air to the engine.

For example, Patent Literature 1 describes a turbocharger provided with a semi-floating bearing, which is a type of bearing. The semi-floating bearing has a main body portion with a through-hole through which a shaft is inserted. The through-hole has an inner peripheral surface on which a radial bearing surface is formed. The radial bearing surface includes radial grooves each extending in an axial direction of the shaft. Lubricating oil spreads through the radial grooves to the radial bearing surface.

CITATION LIST

Patent Literature

Patent Literature 1: Japanese Patent Application Laid-Open No. 2014-238009

SUMMARY

Technical Problem

When foreign matter is contained in lubricating oil supplied from the engine, there is a possibility that foreign matter of small size may flow into the radial grooves, regardless of an oil filter or the like provided upstream of the turbocharger. The Foreign matter flowing into the radial grooves may enter a clearance between the radial bearing surface and the shaft as the shaft rotates. For this reason, development of a technique to suppress entry of foreign matter into a clearance between a radial bearing surface and a shaft is demanded.

An object of the present disclosure is to provide a bearing structure and a turbocharger capable of suppressing entry of foreign matter into a clearance between a radial bearing surface and a shaft.

Solution to Problem

In order to solve the above-mentioned problems, a bearing structure according to one aspect of the present disclosure includes a radial bearing surface for rotatably supporting a shaft, and a radial groove having a front wall surface portion and extending to one end of the radial bearing surface, the front wall surface portion being formed between a rear continuous portion positioned on the radial bearing surface and a front continuous portion positioned in front of the rear continuous portion in a rotation direction of the shaft, and extending from the front continuous portion along an imaginary line or extending forward from the front continuous portion relative to the imaginary line in the rotation direction, the imaginary line intersecting a tangent of the radial bearing surface at the front continuous portion at 30 degrees and extending from the front continuous portion in a direction separated from the shaft and backward in the rotation direction, in a cross-section orthogonal to an axial direction of the shaft.

The bearing structure may include a thrust bearing surface formed at an end surface of a bearing body, and a thrust groove continuously formed from the radial groove in the thrust bearing surface and having a maximum width in the rotation direction larger than a width of the radial groove in the rotation direction.

The radial groove may be formed at a position of the radial bearing surface excluding a predetermined range including a portion immediately below an axis of the shaft.

In order to solve the above-mentioned problems, another bearing structure according to one aspect of the present disclosure includes a radial bearing surface for rotatably supporting a shaft, and a radial groove having a rear continuous portion positioned on the radial bearing surface and a front continuous portion positioned in front of the rear continuous portion in a rotation direction of the shaft, having an angle between a tangent of the radial bearing surface at the front continuous portion and a front wall surface portion extending from the front continuous portion of not less than 30 degrees in a cross-section orthogonal to an axial direction of the shaft, and extending to one end of the radial bearing surface.

In order to solve the above problems, a turbocharger according to one aspect of the present disclosure includes the bearing structure described above.

Effects of Disclosure

According to the present disclosure, entry of foreign matter into a clearance between a radial bearing surface and a shaft can be suppressed.

DESCRIPTION OF EMBODIMENTS

Hereinafter, an embodiment of a bearing structure and a turbocharger will be described in detail with reference to the accompanying drawings. Dimensions, materials, other specific numerical values, and the like described in the embodiment are merely examples for ease of understanding and do not limit a structure unless otherwise specified. Note that, in the present description and drawings, elements having substantially the same functions and configurations are denoted by the same reference numerals, and repeated description will be omitted.

Figure 1:
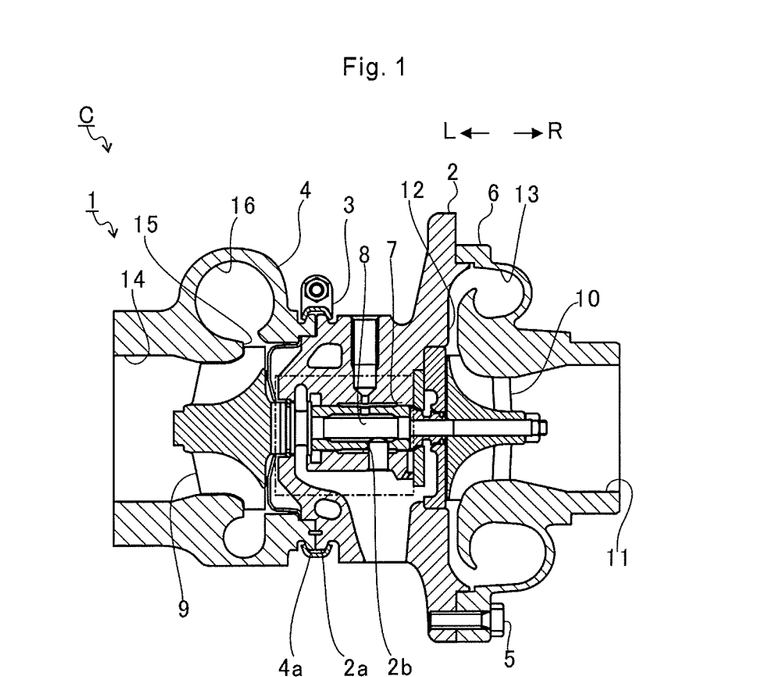
FIG. 1 is a schematic cross-sectional view of a turbocharger.

FIG. 1 is a schematic cross-sectional view of a turbocharger C. Hereinafter, descriptions are given assuming that a direction indicated by an arrow L illustrated in FIG. 1 is the left side of the turbocharger C. Descriptions are given assuming that a direction indicated by an arrow R illustrated in FIG. 1 is the right side of the turbocharger C. As illustrated in FIG. 1, the turbocharger C includes a turbocharger body 1. The turbocharger body 1 includes a bearing housing 2. On the left side of the bearing housing 2, a turbine housing 4 is connected by a fastening mechanism 3. On the right side of the bearing housing 2, a compressor housing 6 is connected by a fastening bolt 5. The bearing housing 2, the turbine housing 4, and the compressor housing 6 are integrated with each other.

On an outer peripheral surface of the bearing housing 2 in the vicinity of the turbine housing 4, a protrusion 2a is formed. The protrusion 2a protrudes in a radial direction of the bearing housing 2. On an outer peripheral surface of the turbine housing 4 in the vicinity of the bearing housing 2, a protrusion 4a is formed. The protrusion 4a protrudes in a radial direction of the turbine housing 4. The bearing housing 2 and the turbine housing 4 are secured to each other by band-fastening the protrusions 2a and 4a with the fastening mechanism 3. The fastening mechanism 3 includes, for example, a G coupling for clamping the protrusions 2a and 4a.

The bearing housing 2 includes a bearing hole 2b. The bearing hole 2b penetrates the turbocharger C in left and right directions. In the bearing hole 2b, a semi-floating bearing 7 is provided. The semi-floating bearing 7 rotatably supports a shaft 8.

The shaft 8 has a left end portion at which a turbine impeller 9 is integrally attached. The turbine impeller 9 is rotatably accommodated in the turbine housing 4. Moreover, the shaft 8 has a right end portion at which a compressor impeller 10 is integrally attached. The compressor impeller 10 is rotatably accommodated in the compressor housing 6.

The compressor housing 6 includes an intake port 11. The intake port 11 opens to the right side of the turbocharger C. The intake port 11 is connected to an air cleaner not illustrated. Opposing surfaces of the bearing housing 2 and the compressor housing 6 define a diffuser flow passage 12. The diffuser flow passage 12 pressurizes air. The diffuser flow passage 12 is annularly formed from inward to outward in a radial direction of the shaft 8. The diffuser flow passage 12 communicates with the intake port 11 via the compressor impeller 10 on the inner side of the radial direction.

Furthermore, the compressor housing 6 is provided with a compressor scroll flow passage 13 having an annular shape. The compressor scroll flow passage 13 is positioned outward from the diffuser flow passage 12 in a radial direction of the shaft 8. The compressor scroll flow passage 13 communicates with an intake port of an engine not illustrated and the diffuser flow passage 12. When the compressor impeller 10 rotates, air is sucked into the compressor housing 6 from the intake port 11. The sucked air is accelerated by the action of a centrifugal force in the process of flowing between blades of the compressor impeller 10. The accelerated air is raised in pressure in the diffuser flow passage 12 and the compressor scroll flow passage 13 and guided to the intake port of the engine.

The turbine housing 4 includes a discharge port 14. The discharge port 14 opens on the left side of the turbocharger C. The discharge port 14 is connected to an exhaust emission control system (not illustrated). In addition, a flow passage 15 is provided in the turbine housing 4. The turbine housing 4 further includes a turbine scroll flow passage 16 having an annular shape. The turbine scroll flow passage 16 is positioned outward from the flow passage 15 in a radial direction of the turbine impeller 9. The turbine scroll flow passage 16 communicates with a gas inlet port not illustrated. To the gas inlet port, exhaust gas is guided which is discharged from an exhaust manifold of the engine not illustrated. The turbine scroll flow passage 16 communicates also with the flow passage 15. Therefore, exhaust gas guided from the gas inlet port to the turbine scroll flow passage 16 is guided to the discharge port 14 via the flow passage 15 and the turbine impeller 9. The exhaust gas rotates the turbine impeller 9 in the process of flowing therethrough.

The rotational force of the turbine impeller 9 is then transmitted to the compressor impeller 10 via the shaft 8.

When the compressor impeller 10 rotates, air is raised in pressure as described above. In this way, air is led to the intake port of the engine.

Figure 2:
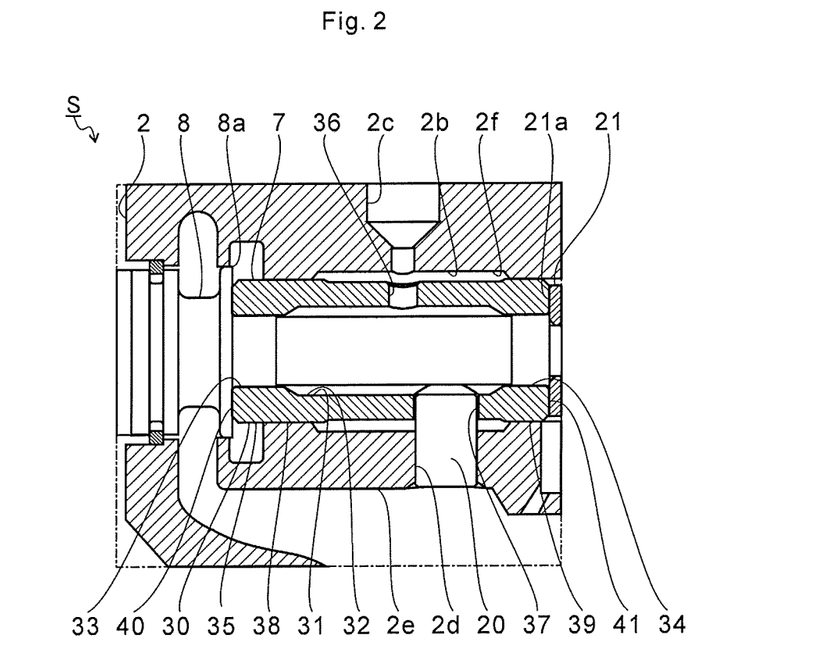
FIG. 2 is a diagram of a portion indicated by a one-dot chain line of FIG. 1.

FIG. 2 is a diagram of a portion indicated by a one-dot chain line of FIG. 1. As illustrated in FIG. 2, a bearing structure S is provided inside the bearing housing 2.

In the bearing structure S, the bearing housing 2 includes an oil passage 2c. Lubricating oil flows into the bearing hole 2b from the oil passage 2c. In the bearing hole 2b, the semi-floating bearing 7 is disposed. The semi-floating bearing 7 has a main body portion 30 (bearing body) in which a through-hole 31 is defined. The through-hole 31 penetrates the main body portion 30 in an axial direction of the shaft 8 (hereinafter simply referred to as the axial direction). In the through-hole 31, the shaft 8 is inserted. On an inner peripheral surface 32 of the through-hole 31 near the turbine impeller 9, a radial bearing surface 33 is formed. On an inner peripheral surface 32 of the through-hole 31 near the compressor impeller 10, a radial bearing surface 34 is formed. Two of the radial bearing surfaces 33 and 34 are separated from each other in the axial direction of the shaft 8.

Between two of the radial bearing surfaces 33 and 34 of the main body portion 30, an oil hole 36 opens. The oil hole 36 penetrates the main body portion 30 from the inner peripheral surface 32 to the outer peripheral surface 35 thereof. Part of lubricating oil supplied to the bearing hole 2b flows into the through-hole 31 of the main body portion 30 through the oil hole 36. The lubricating oil flowing into the through-hole 31 spreads from the oil hole 36 to the sides of the turbine impeller 9 and the compressor impeller 10. Then, the lubricating oil is supplied to clearances between the shaft 8 and the radial bearing surfaces 33 and 34. The lubricating oil supplied to the clearances between the shaft 8 and the radial bearing surfaces 33 and 34 has an oil film pressure by which the shaft 8 is rotatably supported.

Furthermore, the main body portion 30 includes a positioning hole 37. The positioning hole 37 penetrates the main body portion 30 from the inner peripheral surface 32 to the outer peripheral surface 35. The bearing housing 2 includes a pin hole 2d. The pin hole 2d penetrates a wall portion 2e located on the lower side in FIG. 2 in the wall portion of the bearing housing 2 forming the bearing hole 2b. The pin hole 2d faces the positioning hole 37. A positioning pin 20 is press-fitted into the pin hole 2d from below in FIG. 2. The tip of the positioning pin 20 is inserted into the positioning hole 37 to restrict the rotation and axial movement of the semi-floating bearing 7.

Furthermore, on the outer peripheral surface of the main body portion 30, two of damper portions 38 and 39 are formed. The damper portion 38 is provided on the left side (the turbine impeller 9 side) of the main body portion 30 in FIG. 2. The damper portion 39 is provided on the right side (the compressor impeller 10 side) of the main body portion 30 in FIG. 2. Two of the damper portions 38 and 39 are separated in the axial direction. Lubricating oil is supplied from the oil passage 2c to clearances between the damper portions 38 and 39 and an inner peripheral surface 2f of the bearing hole 2b. Vibration of the shaft 8 is suppressed by the oil film pressure of the lubricating oil.

An oil thrower member 21 is attached to the shaft 8. The oil thrower member 21 is an annular member. The oil thrower member 21 is arranged on the right side (compressor impeller 10 side) relative to the main body portion 30 in FIG. 2. The oil thrower member 21 axially faces the main body portion 30. The oil thrower member 21 has an opposing surface 21a opposing to the main body portion 30, and the opposing surface 21a has an outer diameter larger than an inner diameter of the radial bearing surface 34 and smaller than an outer diameter of the main body portion 30.

Part of lubricating oil flows from the semi-floating bearing 7 toward the compressor impeller 10. The oil thrower member 21 scatters the lubricating oil radially outward. In this manner, the oil thrower member 21 suppresses leakage of lubricating oil toward the compressor impeller 10.

The shaft 8 has a large diameter portion 8a. The large diameter portion 8a is positioned on the left side (the turbine impeller 9 side) relative to the main body portion 30 in FIG. 2. The large diameter portion 8a axially faces the main body portion 30. The large diameter portion 8a has an outer diameter, for example, larger than the inner diameter of the radial bearing surface 33 of the main body portion 30. The outer diameter of the large diameter portion 8a is also larger than the outer diameter of the main body portion 30.

The main body portion 30 is held between the oil thrower member 21 and the large diameter portion 8a in the axial direction. The main body portion 30 has an axial length slightly smaller than a distance between the large diameter portion 8a and the oil thrower member 21. The shaft 8 is configured to move slightly in the axial direction.

Lubricating oil is supplied to a clearance between the main body portion 30 and the oil thrower member 21 and a clearance between the main body portion 30 and the large diameter portion 8a. When the shaft 8 moves in the axial direction, the oil film pressure between the oil thrower member 21 or the large diameter portion 8a and the main body portion 30 supports the axial load.

That is, an end surface of the main body portion 30 near the turbine impeller 9 serves as a thrust bearing surface 40. An end surface of the main body portion 30 near the compressor impeller 10 serves as a thrust bearing surface 41. Two of the thrust bearing surfaces 40 and 41 receive a thrust load.

Figure 3:
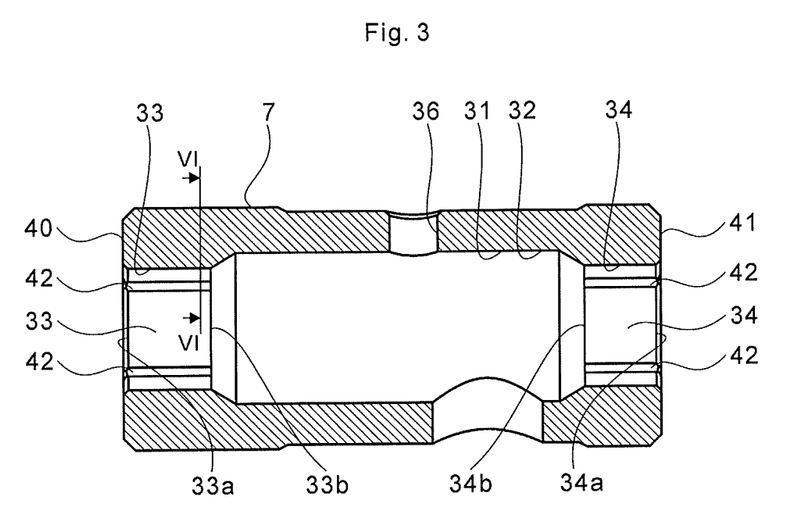
FIG. 3 is a diagram of a semi-floating bearing extracted from FIG. 2.

FIG. 3 is a diagram of the semi-floating bearing 7 extracted from FIG. 2. The radial bearing surfaces 33 and 34 have radial grooves 42 in the axial direction. A plurality of the radial grooves 42 are provided so as to be spaced apart from each other in a rotation direction of the shaft 8 (for example, in a circumferential direction of the inner peripheral surface 32 of the through-hole 31, hereinafter simply referred to as rotation direction). A plurality of (for example, four) the radial grooves 42 are provided on each of the radial bearing surfaces 33 and 34. Each of the radial grooves 42 provided in the radial bearing surface 33 extends from one end 33a on the thrust bearing surface 40 to the other end 33b. Each of the radial groove 42 provided in the radial bearing surface 34 extends from one end 34a on the thrust bearing surface 41 to the other end 34b. Part of lubricating oil flowing into the through-hole 31 from the oil hole 36 flows into each radial groove 42. Part of the lubricating oil flowing into the radial groove 42 is supplied to the radial bearing surfaces 33 and 34 as the shaft 8 rotates. Part of the lubricating oil flowing into the radial groove 42 is supplied to the thrust bearing surfaces 40 and 41.

Figure 4A:
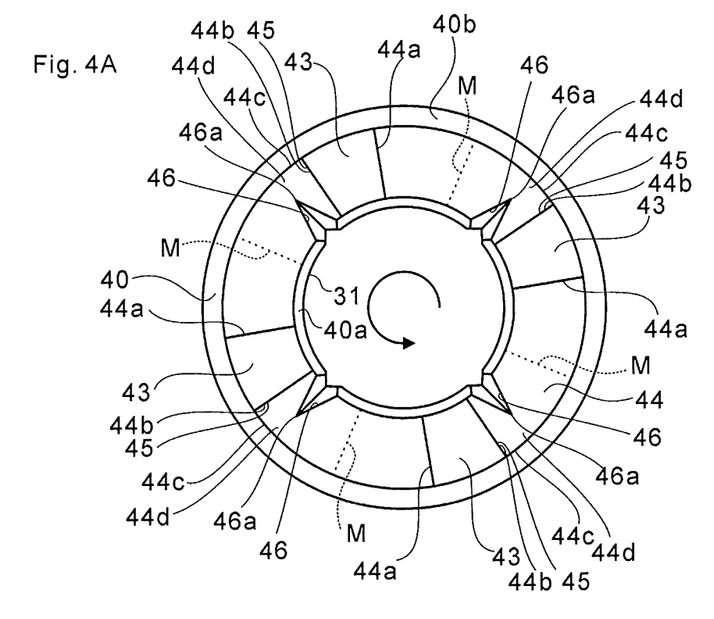
FIG. 4A is a diagram illustrating a thrust bearing surface.
Figure 4B:
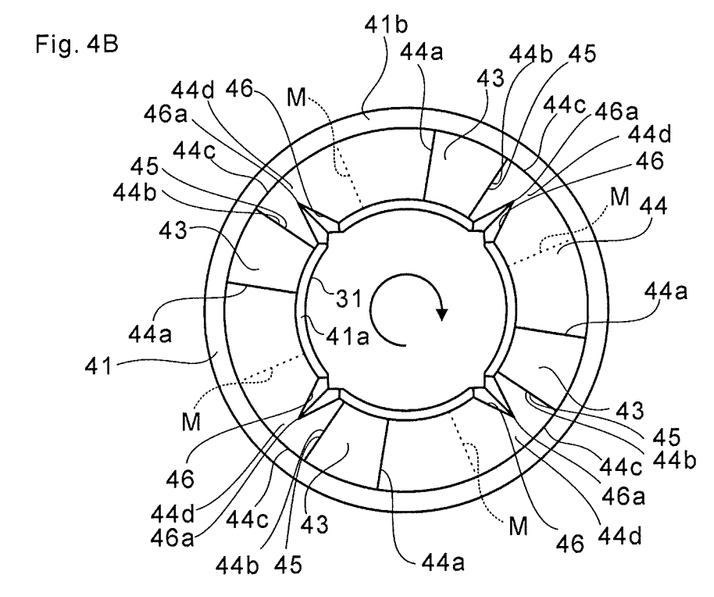
FIG. 4B is a diagram illustrating a thrust bearing surface.

FIG. 4A is a diagram illustrating the thrust bearing surface 40. FIG. 4B is a diagram illustrating the thrust bearing surface 41. In FIGS. 4A and 4B, the rotation direction is indicated by an arrow. In the thrust bearing surfaces 40 and 41, the through-hole 31 opens. The thrust bearing surfaces 40 and 41 include chamfered portions 40a and 41a, respectively, at the boundaries between the thrust bearing surfaces 40 and 41 and the through-holes 31. On the outer peripheral sides of the thrust bearing surfaces 40 and 41, chamfered portions 40b and 41b are formed.

The thrust bearing surfaces 40 and 41 each include a land portion 43 and a tapered portion 44. The land portion 43 is a surface perpendicular to the axis of the main body portion 30. A plurality of (for example, four) land portions 43 are separately provided in the rotation direction. The tapered portions 44 are formed one by one between two of the land portions 43 adjacent to each other in the rotation direction. A land portion 43 corresponds to a tapered portion 44 and is positioned in back of the tapered portion 44 in the rotation direction, as described below.

The tapered portion 44 is an inclined surface whose projection height in an insertion direction of the shaft 8 (hereinafter simply referred to as projection height) increases forward in the rotation direction. For example, in FIG. 4A, the tapered portion 44 protrudes to the front side in the drawing (in a direction of the large diameter portion 8a), on the front side in the rotation direction. The tapered portion 44 has an end portion 44a on the front side in the rotation direction, and the end portion 44a is flush with the land portion 43. Furthermore, in FIG. 4A, the tapered portion 44 decreases in height to the rear side in the drawing (in a direction separated from the large diameter portion 8a) on the rear side in the rotation direction. The tapered portion 44 has an end portion 44b on the rear side in the rotation direction, and the end portion 44b is smaller in height than the land portion 43. The boundary between the end portion 44b of the tapered portion 44 and the land portion 43 is formed into a step surface 45.

Each of the tapered portions 44 includes a thrust groove 46. Each thrust groove 46 is formed outward from the through-hole 31 in the radial direction. The thrust groove 46 extends to an inside portion in the radial direction relative to an outer peripheral end 44c of the tapered portion 44. That is, the tapered portion 44 has an inclined surface 44d in which the thrust groove 46 is not formed, between the outer peripheral end 44c (the boundary between the tapered portion 44 and each of the chamfered portions 40b and 41b) and the thrust groove 46.

The thrust groove 46 has an outer peripheral end 46a which is positioned in the vicinity of the center of the tapered portion 44 in the radial direction. However, the outer peripheral end 46a may be positioned inward from the center of the tapered portion 44 in the radial direction. Furthermore, the outer peripheral end 46a may be positioned outward from the center of the tapered portion 44 in the radial direction.

The thrust groove 46 has a depth reduced toward the outer peripheral end 46a. The outer peripheral end 46a is flush with the inclined surface 44d of the tapered portion 44 in which the thrust groove 46 is not formed. That is, the thrust groove 46 is connected to the inclined surface 44d at the outer peripheral end 46a.

In this configuration, a level difference between the tapered portion 44 and the thrust groove 46 is small, and a change in flow direction of lubricating oil flowing from the thrust groove 46 to the inclined surface 44d is reduced. Thus, a change in pressure of lubricating oil is suppressed. Furthermore, for example, cavitation hardly occurs in lubricating oil flowing out from the thrust groove 46. The flow of the lubricating oil flowing out from the thrust groove 46 is hardly impeded. However, a step parallel to the axial direction may be formed at the boundary between the thrust groove 46 and the inclined surface 44d.

The thrust groove 46 is positioned on the rear side of the tapered portion 44 in the rotation direction. In other words, the thrust groove 46 is positioned in back of a width center M of the tapered portion 44 in the rotation direction.

Figure 5A:
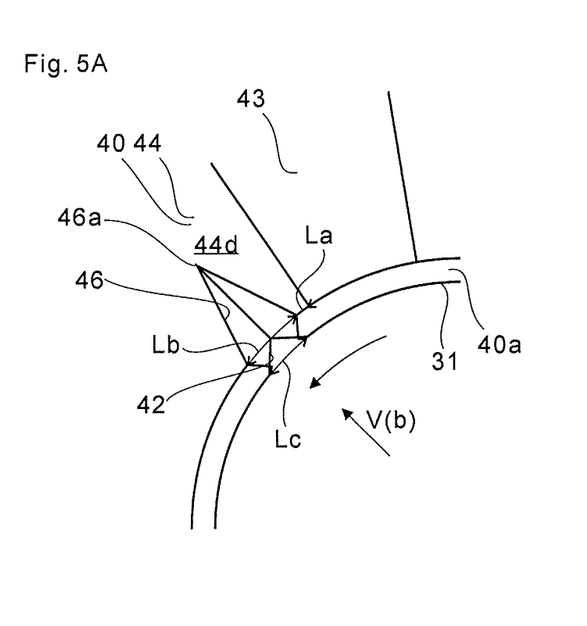
FIG. 5A is a diagram of a portion in the vicinity of a thrust groove extracted from FIG. 4A.
Figure 5B:
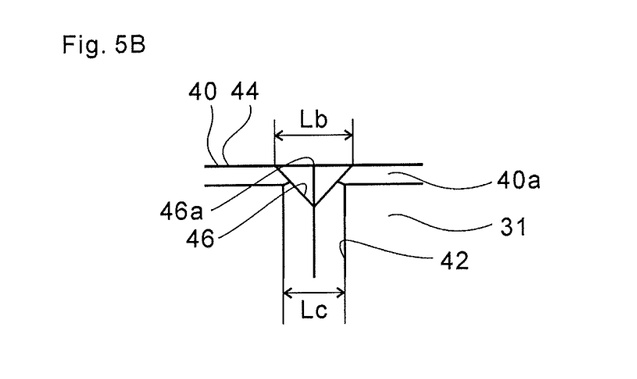
FIG. 5B is a diagram of a semi-floating bearing of FIG. 5A as viewed in the direction indicated by an arrow VB.

FIG. 5A is a diagram of a portion in the vicinity of the thrust groove 46 extracted from FIG. 4A. FIG. 5B is a diagram of the semi-floating bearing 7 of FIG. 5A as viewed in the direction indicated by an arrow VB. Hereinafter, in order to avoid redundant description, configurations provided in both of the thrust bearing surfaces 40 and 41 may be exemplified by the thrust bearing surface 40.

As illustrated in FIG. 5A, each thrust groove 46 is separated from a land portion 43 positioned on the rear side in the rotation direction. The thrust groove 46 has a front side and a rear side in the rotation direction both positioned in the inclined surface 44d of the tapered portion 44. As described above, the tapered portion 44 has a projecting height smaller than that of the land portion 43. Therefore, even when an edge is formed in the thrust groove 46, the edge is unlikely to contact with the large diameter portion 8a or the oil thrower member 21. However, when the edge of the thrust groove 46 can be sufficiently reduced, the thrust groove 46 may be adjacent to the land portion 43 on the rear side in the rotation direction.

A distance La in the rotation direction between the land portion 43 in back of the tapered portion 44 in the rotation direction and the thrust groove 46 is smaller than a width of the thrust groove 46 in the rotation direction. Here, the width of the thrust groove 46 in the rotation direction represents, for example, a maximum width Lb of the thrust groove 46 in the rotation direction. The width of the thrust groove 46 in the rotation direction has the maximum value, for example, at an outer peripheral end of the chamfered portion 40a. The thrust groove 46 tapers toward the outer peripheral end 46a.

As illustrated in FIG. 5B, the thrust groove 46 is deepest at the center (center portion) of the width in the rotation direction. The thrust groove 46 has a depth reduced toward both end sides in the rotation direction. The thrust groove 46 has an approximately triangular shape when viewed from an inner side in the radial direction. As illustrated in FIG. 5A, the radial groove 42 is deepest at the center of the width in the rotation direction. The radial groove 42 has a depth reduced toward both end sides in the rotation direction. The radial groove 42 has an approximately triangular shape when viewed in an axial direction. That is, the thrust groove 46 and the radial groove 42 each have a width in the rotation direction decreasing as the depth (outer side in the radial direction) increases.

The thrust groove 46 extends to the chamfered portion 40a in the axial direction and opens. The radial groove 42 extends radially inward to the chamfered portion 40a. The thrust groove 46 and the radial groove 42 are continued to (communicate with) each other at the chamfered portion 40a.

The radial groove 42 has a width Lc in the rotation direction smaller than the maximum width Lb of the thrust groove 46 in the rotation direction. The width Lc of the radial groove 42 is, for example, a width of the continuous portion to the thrust groove 46.

Lubricating oil flows into the thrust groove 46 from the radial groove 42. The lubricating oil flowing into the thrust groove 46 flows out from the thrust groove 46 as the shaft 8 rotates. The lubricating oil is supplied to the inclined surface 44d of the tapered portion 44 in which the thrust groove 46 is not formed. As the shaft 8 rotates, the lubricating oil is supplied to the land portion 43.

The thrust groove 46 extends from the through-hole 31 only to an inside portion of the tapered portion 44 in the radial direction relative to the outer peripheral end 44c of the tapered portion 44. Therefore, as compared with a thrust groove 46 formed up to the outer peripheral end 44c of the tapered portion 44, lubricating oil does not flow through the tapered portion 44 (not consumed at each of thrust bearing surfaces 40 and 41) by a centrifugal force of the shaft 8, and the amount of lubricating oil flowing out of the thrust bearing surfaces 40 and 41 is reduced. Then, the amount of lubricating oil supplied to the inner peripheral sides of the thrust bearing surfaces 40 and 41 increases. Thus, the amount of lubricating oil supplied to the tapered portions 44 of the thrust bearing surfaces 40 and 41 increases, uniform loading capacity is obtained, and bearing performance is increased.

Furthermore, as described above, the thrust groove 46 is provided in the tapered portion 44. The projecting height of the tapered portion 44 in the insertion direction of the shaft 8 is lower than that of the land portion 43. Therefore, compared with a thrust groove provided outside the tapered portion 44 (for example, in the land portion 43 or between the land portion 43 and the tapered portion 44), the thrust groove provided in the tapered portion 44 has the following advantages. That is, a difference in level between the inclined surface 44d in which the thrust groove 46 is not formed and the thrust groove 46 is reduced, in the thrust bearing surfaces 40 and 41. Therefore, a change in the flow direction of lubricating oil is reduced, and a change in pressure of the lubricating oil is suppressed. For example, cavitation hardly occurs in lubricating oil flowing out from the thrust groove 46. The flow of the lubricating oil flowing out from the thrust groove 46 is hardly impeded.

Figure 6:
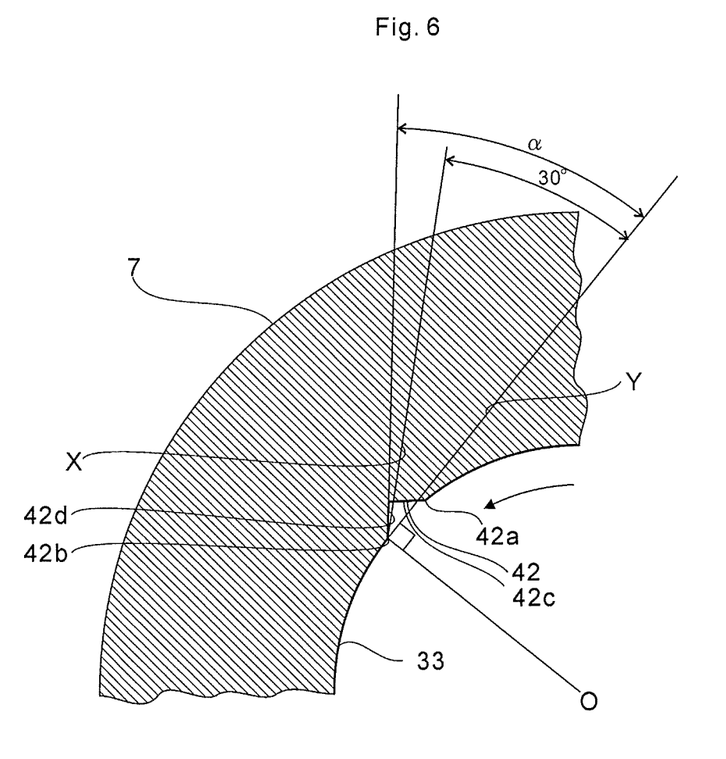
FIG. 6 is a cross-sectional view taken along line VI-VI of FIG. 3.

FIG. 6 is a cross-sectional view taken along line VI-VI of FIG. 3. FIG. 6 illustrates a cross-section of the semi-floating bearing 7, orthogonal to the shaft 8. The radial groove 42 has an approximately triangular cross-section as illustrated in FIG. 6. The radial groove 42 includes a rear continuous portion 42a (a rear end portion) and a front continuous portion 42b (a front end portion).

The rear continuous portion 42a and the front continuous portion 42b are positioned on the radial bearing surface 33. Each of the rear continuous portion 42a and the front continuous portion 42b is a portion of the radial groove 42 continuous with the radial bearing surface 33. The front continuous portion 42b is positioned in front of the rear continuous portion 42a in the rotation direction.

A rear wall surface portion 42c and a front wall surface portion 42d are formed between the rear continuous portion 42a and the front continuous portion 42b of the radial groove 42. The rear wall surface portion 42c is positioned in back of the front wall surface portion 42d in the rotation direction. The radial groove 42 is deepest at a boundary portion between the rear wall surface portion 42c and the front wall surface portion 42d. The rear wall surface portion 42c linearly extends from the rear continuous portion 42a to a boundary portion between the front wall surface portion 42d and the rear wall surface portion 42c. The front wall surface portion 42d linearly extends from the front continuous portion 42b to a boundary portion between the rear wall surface portion 42c and the front wall surface portion 42d. Here, the rear wall surface portion 42c and the front wall surface portion 42d have approximately the same length in the cross-section illustrated in FIG. 6. Here, an angle between the rear wall surface portion 42c and the front wall surface portion 42d is an obtuse angle which is roughly a right angle. However, an angle between the rear continuous portion 42a and the front wall surface portion 42d may be a right angle or an acute angle.

The front wall surface portion 42d extends forward from the front continuous portion 42b relative to an imaginary line X in the rotation direction. Here, the imaginary line X is a straight line intersecting a tangent Y of the radial bearing surface 33 at the front continuous portion 42b at 30 degrees. Furthermore, the imaginary line X extends rearward from the front continuous portion 42b in the rotation direction. That is, an angle α between the tangent Y and the front wall surface portion 42d is not less than 30 degrees.

Here, the front wall surface portion 42d extending forward from the front continuous portion 42b relative to the imaginary line X in the rotation direction has been described. However, the front wall surface portion 42d may extend from the front continuous portion 42b along the imaginary line X. That is, the angle α may be 30 degrees.

Figure 7A:
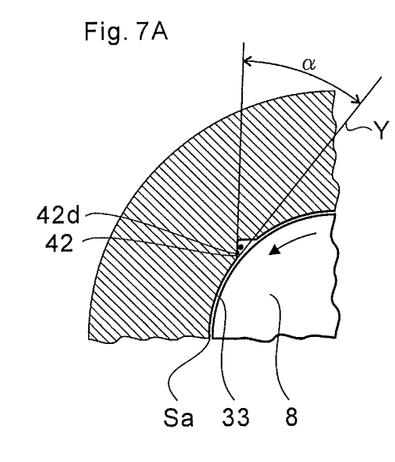
FIG. 7A is a diagram illustrating a radial groove according to the present embodiment.
Figure 7B:
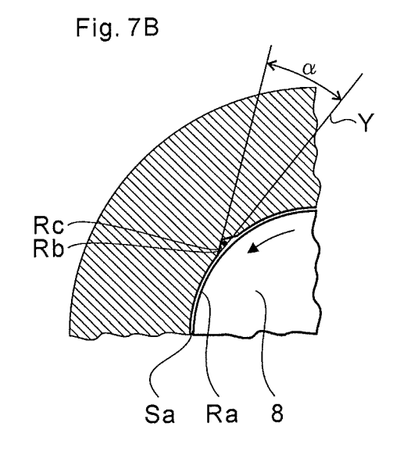
FIG. 7B is a diagram illustrating a radial groove according to a comparative example.

FIG. 7A is a diagram illustrating a radial groove 42 according to the present embodiment. FIG. 7B is a diagram illustrating a radial groove Rb according to a comparative example. In the radial groove Rb according to the comparative example illustrated in FIG. 7B, the angle α between the tangent Y and a front wall surface portion Rc is less than 30 degrees.

In the comparative example, when foreign matter enters the radial groove Rb, the foreign matter (indicated by a black circle in FIG. 7B) easily enters a bearing clearance Sa between the radial bearing surface Ra and the shaft 8 as the shaft 8 rotates. On the other hand, in the present embodiment, when foreign matter (indicated by a black circle in FIG. 7A) enters the radial groove 42, as compared with the comparative example, the foreign matter hardly enters the bearing clearance Sa between the radial bearing surface 33 and the shaft 8. Therefore, the foreign matter is easily discharged from the thrust bearing surface 40 through the radial groove 42.

On the other hand, when the angle α becomes too large, lubricating oil flows from the radial groove 42 to the bearing clearance Sa with an increased resistance. Therefore, an upper limit value of the angle α is set so that the resistance to the flow of lubricating oil does not become too large.

The upper limit value of the angle α can be, for example, within the range of 30 degrees to 45 degrees.

Figure 8A:
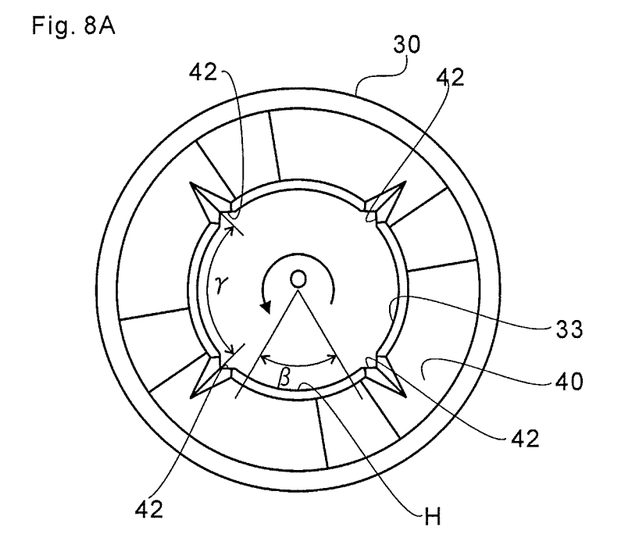
FIG. 8A is a diagram illustrating a thrust bearing surface.
Figure 8B:
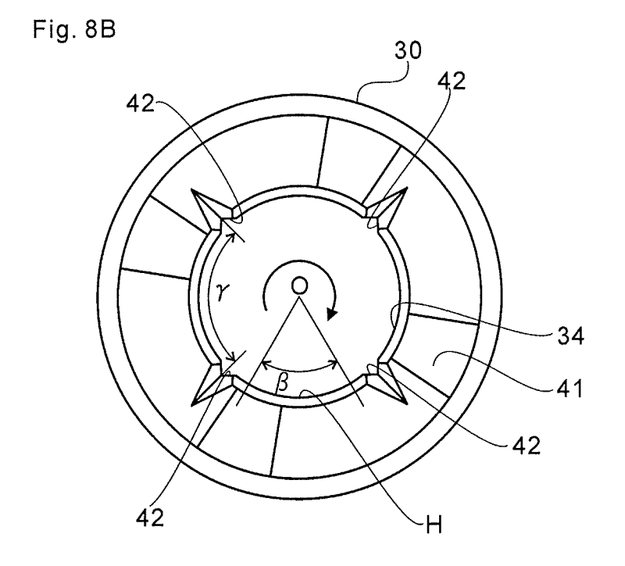
FIG. 8B is a diagram illustrating a thrust bearing surface.

FIG. 8A is a diagram illustrating the thrust bearing surface 40. FIG. 8B is a diagram illustrating the thrust bearing surface 41. As illustrated in FIGS. 8A and 8B, the radial grooves 42 are formed at positions of each of the radial bearing surfaces 33 and 34, excluding a predetermined range including a portion H immediately below an axis O of the shaft 8 inserted into the main body portion 30. In FIGS. 8A and 8B, the central angle of each of the radial bearing surfaces 33 and 34 in the predetermined range is illustrated as an angle β. The angle β is, for example, within the range of 60 degrees to 120 degrees.

Here, it is assumed that an arrangement interval of the radial grooves 42 (an interval of the radial grooves 42 adjacent to each other in the rotation direction, an interval of the radial grooves 42 adjacent to each other in the circumferential direction of the thrust bearing surface 40) is defined as γ degrees. The angle range of angle β can be γ-γ/2 to γ-γ/3. In one example of the present embodiment, the radial grooves 42 are regularly arranged in four positions at 90 degree intervals in the circumferential direction. A lower limit value of the angle β is 90/2=45 degrees, and 90 degrees −45 degrees=45 degrees. The upper limit value of the angle β is 90/3=30 degrees, and 90 degrees −30 degrees=60 degrees. For example, it is assumed that the radial grooves 42 are circumferentially arranged at eight positions, regularly at 45 degree intervals. The lower limit value of the angle range is 45/2=22.5 degrees, and 45 degrees−22.5 degrees=22.5 degrees. Furthermore, the upper limit value of the angle range is 45/3=15 degrees, and 45 degrees−15 degrees=30 degrees.

In this case, for example, as compared with a radial groove formed at the portion H immediately below the axis O of the shaft 8, foreign matter hardly enters the bearing clearance Sa between the radial bearing surface 33 and the shaft 8 when the rotation of the shaft 8 starts. When the rotation of the shaft 8 starts, the shaft 8 sinks vertically downward due to its own weight. Here, due to the gravity, the foreign matter tends to accumulate in the bearing clearance Sa between the shaft 8 and the portion H of the radial bearing surface 33 and further in a radial groove 42. In this state, if a radial groove 42 is formed at the portion H, there is a concern that accumulated foreign matter may enter the radial bearing surface 33 due to a pressure difference generated when the shaft 8 starts to rotate. Furthermore, the shaft 8 floats upon starting to rotate due to the oil film pressure, but when a radial groove 42 is formed at the portion H immediately below the axis O, an oil film reaction force decreases and the shaft 8 hardly floats, and the bearing clearance Sa narrows.

In the present embodiment, the radial grooves 42 are formed at positions of each of the radial bearing surfaces 33 and 34, excluding the predetermined range including the portion H immediately below the axis O of the shaft 8. Therefore, the probability of entry of foreign matter to the radial bearing surface 33 can be reduced, as compared with the case where the radial groove 42 is located at the portion H when the rotation starts. In addition, since the radial groove 42 is not at the portion H, it is possible to generate the oil film reaction force when the rotation starts, and a reduction in the bearing clearance Sa between the shaft 8 and the radial bearing surface 33 can be prevented.

Figure 9A:
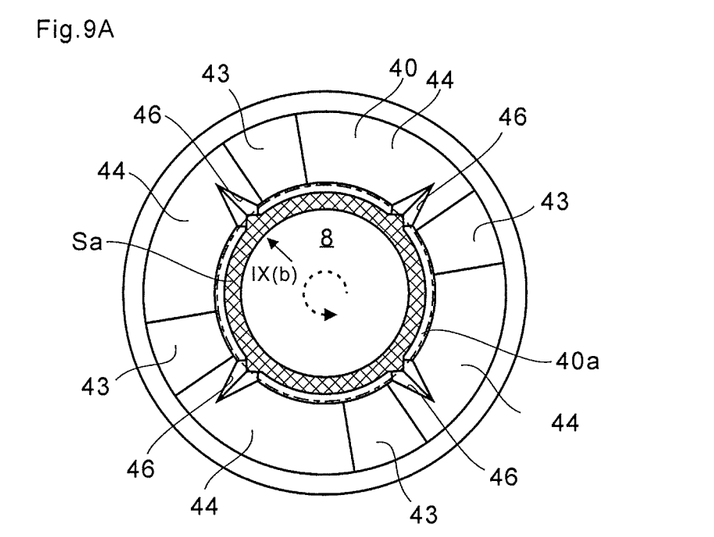
FIG. 9A is a diagram illustrating a shaft and a thrust bearing surface.
Figure 9B:
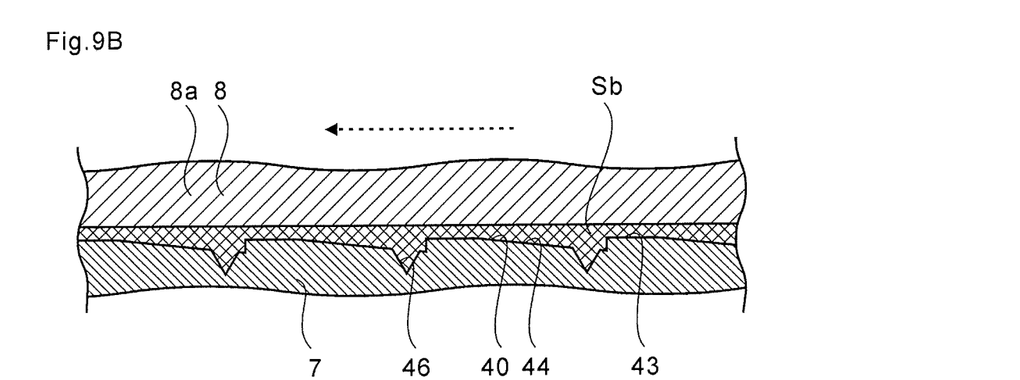
FIG. 9B is a cross-sectional view of a portion of a semi-floating bearing and the shaft (large diameter portion) indicated by a one-dot chain line of FIG. 9A as viewed in the direction indicated by an arrow IXB.

FIG. 9A is a diagram illustrating the shaft 8 and the thrust bearing surface 40. FIG. 9B is a cross-sectional view of a portion of the semi-floating bearing 7 and the shaft 8 (large diameter portion 8a) indicated by a one-dot chain line of FIG. 9A as viewed in the direction indicated by an arrow IXB. FIG. 9B illustrates a portion extracted from a developed plan view of the cross-section, which is a cylindrical shape, of the portion indicated by the one-dot chain line of FIG. 9A. Here, in FIG. 9A, the one-dotted chain line indicating the position of the cross-section of FIG. 9B is illustrated slightly inward from the outer peripheral end of the chamfered portion 40a. However, the position of the cross-section of FIG. 9B is actually positioned at the outer peripheral end of the chamfered portion 40a. In FIGS. 9A and 9B, the rotation direction is indicated by a dashed arrow. In FIG. 9A, the bearing clearance Sa (indicated by cross hatching) between the shaft 8 and the radial bearing surface 33 is illustrated larger than the actual size thereof. In FIG. 9B, a developed plan view of the cross-section of cylindrical shape is illustrated. In FIG. 9B, a bearing clearance Sb (indicated by cross hatching) between the shaft 8 (the large diameter portion 8a) and the thrust bearing surface 40 is illustrated larger than the actual size thereof. In FIG. 9B, the inclination of the tapered portion 44 is illustrated larger than the actual inclination thereof. In FIG. 9B, the thrust groove 46 is illustrated larger than the actual size thereof.

As described above, the shaft 8 is configured to move slightly in the axial direction. As the shaft 8 moves in the axial direction, the bearing clearances Sb of two of the thrust bearing surfaces 40 and 41 are enlarged or narrowed. Here, a state in which the bearing clearances Sb of two of the thrust bearing surfaces 40 and 41 are equal to each other is referred to as nominal.

Here, flow passage cross-sectional areas of two of the bearing clearances Sa and Sb are compared with each other. The flow passage cross-sectional area of the bearing clearance Sa of the radial bearing surface 33 is a cross-section perpendicular to the axial direction. The flow passage cross-sectional area of the bearing clearance Sb of the thrust bearing surface 40 is a cross-section of a cylindrical surface passing through the outer peripheral end of the chamfered portion 40a and parallel to the axial direction in the nominal state. The flow passage cross-sectional area of the bearing clearance Sb may be larger than the flow path cross-sectional area of the bearing clearance Sa. In this case, lubricating oil easily flows from the bearing clearance Sa of the radial bearing surface 33 to the bearing clearance Sb of the thrust bearing surface 40.

Figure 10A:
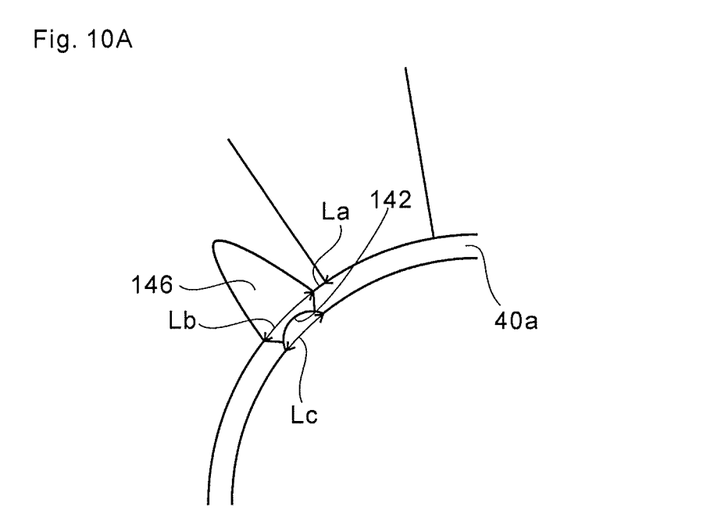
FIG. 10A is a diagram of a portion corresponding to FIG. 5A, according to a first modification.
Figure 10B:
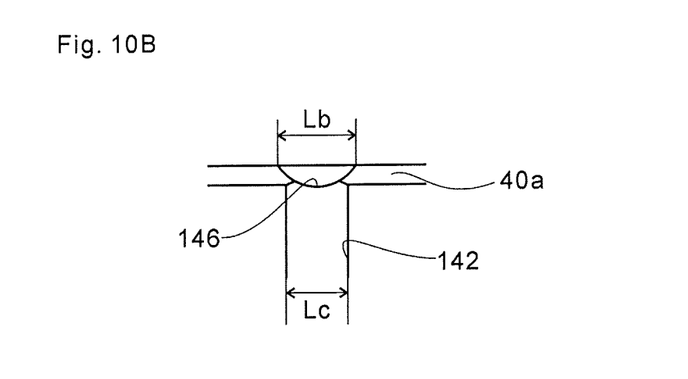
FIG. 10B is a diagram of a portion corresponding to FIG. 5B, according to the first modification.

FIG. 10A is a diagram of a portion corresponding to FIG. 5A, according to a first modification. FIG. 10B is a diagram of a portion corresponding to FIG. 5B, according to the first modification. As illustrated in FIGS. 10A and 10B, in the first modification, a thrust groove 146 has an approximately arc shape (an example of a curved shape) as viewed from an inner side in a radial direction. A radial groove 142 has an approximately arc shape when viewed in an axial direction.

Furthermore, as in the above-described embodiment, the thrust groove 146 and the radial groove 142 extend to the chamfered portion 40a. The thrust groove 146 and the radial groove 142 are continuous with each other at the chamfered portion 40a. The radial groove 142 has a width Lc in the rotation direction smaller than the maximum width Lb of the thrust groove 146 in the rotation direction.

Figure 11:
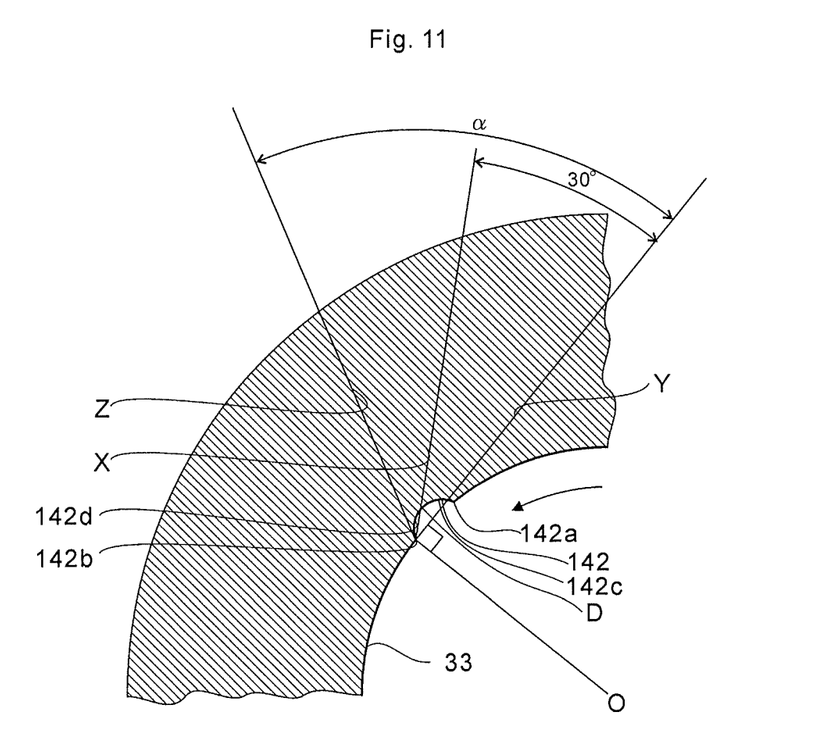
FIG. 11 is a diagram of a portion corresponding to FIG. 6, according to the first modification.

FIG. 11 is a diagram of a portion corresponding to FIG. 6, according to the first modification. The radial groove 142 has a substantially arcuate cross-section as illustrated in FIG. 11. The radial groove 142 includes a rear continuous portion 142a and a front continuous portion 142b as in the above-described embodiment. The rear continuous portion 142a and the front continuous portion 142b are positioned on the radial bearing surface 33. The front continuous portion 142b is positioned in front of the rear continuous portion 142a in the rotation direction.

A rear wall surface portion 142c and a front wall surface portion 142d are formed between the rear continuous portion 142a and the front continuous portion 142b of the radial groove 142. Here, the rear side of the radial groove 142 in the rotation direction is defined as the rear wall surface portion 142c and the front side of the radial groove 142 in the rotation direction is defined as the front wall surface portion 142d, with a deepest position D as the boundary.

The front wall surface portion 142d extends forward from the front continuous portion 142b relative to the imaginary line X in the rotation direction. Here, the imaginary line X intersects a tangent Y of the radial bearing surface 33 at the front continuous portion 142b at 30 degrees. Furthermore, the imaginary line X extends from the front continuous portion 142b in a direction separated from the shaft 8 and rearward in the rotation direction. That is, an angle α between a tangent Z of the front wall surface portion 142d at the front continuous portion 142b and the tangent Y is not less than 30 degrees.

In the first modification as well, as in the above-described embodiment, when foreign matter enters the radial groove 142, the foreign matter hardly enters the bearing clearance Sa between the radial bearing surface 33 and the shaft 8. Therefore, the foreign matter is discharged from the thrust bearing surface 40 through the radial groove 142.

Figure 12A:
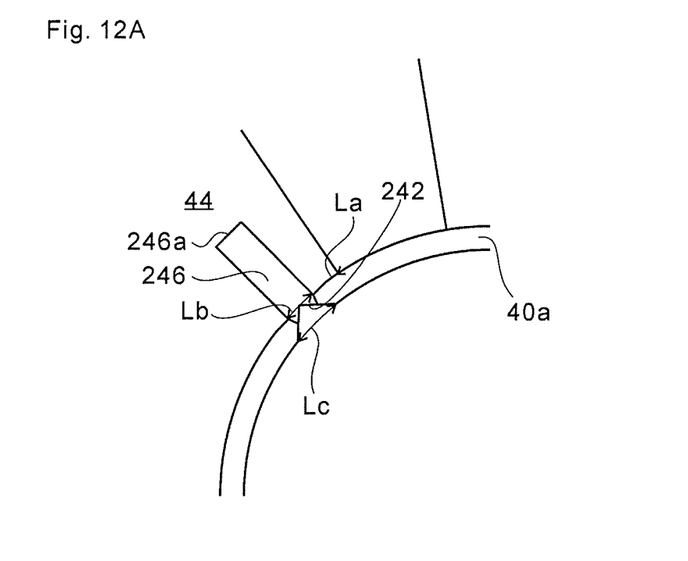
FIG. 12A is a diagram of a portion corresponding to FIG. 5A, according to a second modification.
Figure 12B:
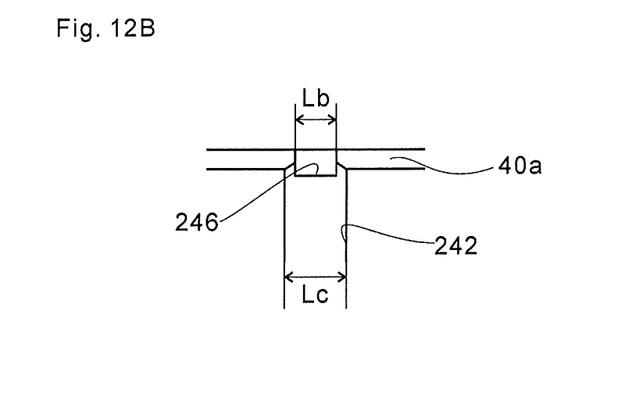
FIG. 12B is a diagram of a portion corresponding to FIG. 5B, according to the second modification.

FIG. 12A is a diagram of a portion corresponding to FIG. 5A, according to a second modification. FIG. 12B is a diagram of a portion corresponding to FIG. 5B, according to the second modification. As illustrated in FIGS. 12A and 12B, in the second modification, a thrust groove 246 has an approximately quadrangular shape when viewed from an inner side in a radial direction. The thrust groove 246 has a depth approximately constant irrespective of the position thereof in the rotation direction. Furthermore, the depth of the thrust groove 246 is reduced toward an outer side in the radial direction. The thrust groove 246 is flush with the tapered portion 44 at an outer peripheral end 246a.

Furthermore, as in the above-described embodiment, the thrust groove 246 and a radial groove 242 extend to the chamfered portion 40a. The thrust groove 246 and the radial groove 242 are continuous with each other at the chamfered portion 40a. However, the radial groove 242 has a width Lc in the rotation direction larger than the maximum width Lb of the thrust groove 246 in the rotation direction. In this way, the width Lc of the radial groove 242 in the rotation direction may be larger than the maximum width Lb of the thrust groove 246 in the rotation direction. The width Lc of the radial groove 242 in the rotation direction may be equal to the maximum width Lb of the thrust groove 246 in the rotation direction.

The embodiment has been described above with reference to the accompanying drawings, but it is needless to say that the respective configurations are not limited to the above embodiment. It is apparent that a person skilled in the art could conceive various alternations and modifications within the scope of claims, and it is to be understood that, as a matter of course, those alternations and modifications fall within the technical scope.

For example, in the embodiment and the modifications described above, the thrust grooves 46, 146, and 246 positioned in back of the width center M of the tapered portion 44 in the rotation direction have been described. In this case, an area of the tapered portion 44 contributing to the wedge effect increases. Therefore, it is easy to increase the oil film pressure. However, the thrust grooves 46, 146, and 246 may be positioned at the width center M. Furthermore, each of the thrust grooves 46, 146, and 246 may be positioned in front of the width center M in the rotation direction.

In the above-described embodiment and the modifications, description has been made of the distance La in the rotation direction between the land portion 43 in back of the tapered portion 44 in the rotation direction and each of the thrust grooves 46, 146, and 246, which is smaller than the width of each of the thrust grooves 46, 146, and 246 in the rotation direction. In this case, an area of the tapered portion 44 contributing to the wedge effect increases. Therefore, it is easy to further increase the oil film pressure. However, the distance La may be the same as the width of each of the thrust grooves 46, 146, and 246 in the rotation direction. In addition, the distance La may be longer than the width of each of the thrust grooves 46, 146, and 246 in the rotation direction.

In the above-described embodiment and the first modification, the thrust grooves 46 and 146 tapered outward in the radial direction have been described. In this case, lubricating oil easily flows from the thrust grooves 46 and 146 to the inclined surface 44d of the tapered portion 44. However, the thrust grooves 46 and 146 may not have the shape tapered outward in the radial direction. For example, as in the second modification described above, the thrust groove 246 may have a width in the rotation direction, approximately constant irrespective of the position in the radial direction. In addition, the width of the thrust groove in the rotation direction may be expanded outward in the radial direction.

Furthermore, in the above-described embodiment, the thrust groove 46 having an approximately triangular shape when viewed from an inner side in the radial direction has been described. The radial groove 42 having an approximately triangular shape when viewed in the axial direction (or in cross-sectional shape illustrated in FIG. 6) has been described. In this case, the thrust groove 46 and the radial groove 42 can be formed by machining with the same tool. Therefore, the number of steps for changing the tool is reduced, and workability is improved. The above-described first modification has the same effect.

In addition, the shapes of the thrust grooves 46, 146, and 246 are not limited to the shapes in the above-described embodiment and modifications. For example, the thrust grooves 46, 146, and 246 may have a trapezoidal shape when viewed from an inner side in the radial direction. That is, the thrust groove 46 may include a bottom surface.

Furthermore, the radial grooves 42, 142, and 242 are not limited to the shapes described in the above-described embodiment and modifications. For example, the radial grooves 42, 142, and 242 may have a trapezoidal cross-section orthogonal to the axis of the shaft 8.

Furthermore, in the above-described embodiment and the first modification, description has been made of the widths Lc of the radial grooves 42 and 142 in the rotation direction, smaller than the maximum widths Lb of the thrust grooves 46 and 146 in the rotation direction. In this case, lubricating oil easily flows from the radial grooves 42 and 142 to the thrust grooves 46 and 146. Therefore, foreign matter entering each of the radial grooves 42 and 142 is rapidly discharged from each of the radial grooves 42 and 142 to the thrust grooves 46 and 146 corresponding to the radial grooves 42 and 142. Thus, entry of foreign matter into a bearing clearance Sa between the radial bearing surfaces 33 or 34 and the shaft 8 is suppressed.

Furthermore, in the above-described embodiment and modifications, the thrust bearing surfaces 40 and 41 formed in the semi-floating bearing 7 has been described. However, apart from the semi-floating bearing 7, a thrust bearing may be provided so that a thrust bearing surface is formed thereon. In this case, instead of the semi-floating bearing 7, a thrust bearing may be separately provided together with another radial bearing, such as a full floating bearing or a rolling bearing. That is, in the above embodiment, the thrust bearing surface and the radial bearing surface are formed of the same member. However, the thrust bearing surface and the radial bearing surface may be formed on separate members.

In the embodiment and the modifications described above, the oil hole 36 provided between two of the radial bearing surfaces 33 and 34 of the main body portion 30 of the semi-floating bearing 7 has been described. However, an oil hole opening in the radial bearing surface 33 and an oil hole opening in the radial bearing surface 34 may be provided. In this case, the oil holes each open, for example, in a radial groove 42 of each of the radial bearing surfaces 33 and 34. Furthermore, the oil passage 2c may be formed to be branched and opened in the inner peripheral surface 2f of the bearing hole 2b so as to face two of the damper portions 38 and 39.

INDUSTRIAL APPLICABILITY

The present disclosure may be applied to a bearing structure having a radial bearing surface and a turbocharger having the bearing structure.

What is claimed is:

1. A bearing structure comprising:
a bearing body;
a radial bearing surface formed in the bearing body and rotatably supporting a shaft;
a radial groove including a front wall surface portion and extending to one end of the radial bearing surface, the front wall surface portion being formed between a rear continuous portion positioned on the radial bearing surface and a front continuous portion positioned in front of the rear continuous portion in a rotation direction of the shaft, and extending from the front continuous portion along an imaginary line or extending forward from the front continuous portion relative to the imaginary line in the rotation direction, the imaginary line intersecting a tangent of the radial bearing surface at the front continuous portion at 30 degrees and extending from the front continuous portion in a direction separated from the shaft and backward in the rotation direction, in a cross-section orthogonal to an axial direction of the shaft;

a thrust bearing surface formed at an end surface of the bearing body, the thrust bearing surface including a plurality of land portions and a tapered portion, the plurality of land portions being separately provided in the rotation direction, and the tapered portion being formed between two of the land portions adjacent to each other in the rotation direction, the tapered portion being an inclined surface presenting a projection height that increases forward in the rotation direction; and a thrust groove formed on the tapered portion of the thrust bearing surface and continuously formed from the radial groove in the thrust bearing surface and having a maximum width in the rotation direction larger than a maximum width of the radial groove in the rotation direction.

2. The bearing structure according to claim 1, wherein the radial groove is formed at a position of the radial bearing surface excluding a predetermined range including a portion immediately below an axis of the shaft.

3. A turbocharger comprising the bearing structure according to claim 2.

4. A turbocharger comprising the bearing structure according to claim 1.

5. The bearing structure according to claim 1, wherein a flow passage cross-sectional area of a first bearing clearance between the shaft and the thrust bearing surface is greater than a flow path cross-sectional area of a second bearing clearance between the shaft and the radial bearing surface.

6. The bearing structure according to claim 1, wherein the thrust groove extends to an outer peripheral end that is located inside relative to an outer peripheral end of the tapered portion in a radial direction, and the thrust groove has a depth reduced toward the outer peripheral end.

* * * * *